(12) United States Patent
Nakayama et al.

(10) Patent No.: US 8,794,693 B2
(45) Date of Patent: Aug. 5, 2014

(54) SIDE STRUCTURE FOR VEHICLE BODY

(75) Inventors: Manabu Nakayama, Wako (JP);
Mikihito Nei, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/989,633

(22) PCT Filed: Nov. 1, 2011

(86) PCT No.: PCT/JP2011/075156
§ 371 (c)(1),
(2), (4) Date: Jul. 3, 2013

(87) PCT Pub. No.: WO2012/073637
PCT Pub. Date: Jun. 7, 2012

(65) Prior Publication Data
US 2013/0278023 A1 Oct. 24, 2013

(30) Foreign Application Priority Data
Nov. 29, 2010 (JP) ................. 2010-264567

(51) Int. Cl.
*B62D 25/04* (2006.01)
*B62D 25/06* (2006.01)
(52) U.S. Cl.
CPC ............... *B62D 25/04* (2013.01); *B62D 25/06* (2013.01)
USPC ............. 296/193.05; 296/193.06; 296/203.03
(58) Field of Classification Search
CPC ................... B62D 25/04; B62D 25/02

USPC .............. 296/187.12, 193.05, 193.06, 203.03
See application file for complete search history.

(56) References Cited

U.S. PATENT DOCUMENTS

| 2007/0108803 A1* | 5/2007 | Chen et al. ............... 296/203.03 |
| 2012/0153676 A1* | 6/2012 | Shono ...................... 296/193.06 |
| 2012/0161476 A1* | 6/2012 | Baccouche et al. ...... 296/203.01 |
| 2014/0028057 A1* | 1/2014 | Nishimura et al. ...... 296/193.06 |
| 2014/0054927 A1* | 2/2014 | Nakamura et al. ....... 296/193.06 |

FOREIGN PATENT DOCUMENTS

| JP | 60-082485 | 5/1985 |
| JP | 11-348821 | 12/1999 |
| JP | 2001-206240 | 7/2001 |
| JP | 2001-328561 | 11/2001 |
| JP | 2005-125808 | 5/2005 |
| JP | 2009-248577 | 10/2009 |
| JP | 2009-298335 | 12/2009 |

* cited by examiner

*Primary Examiner* — Jason S Morrow
(74) *Attorney, Agent, or Firm* — Rankin, Hill & Clark LLP

(57) ABSTRACT

A side structure for a vehicle body, the side structure having: a side rail and a pillar that are provided at sides of door openings; and trim members that are provided to the side rail and the pillar. In the side structure, a pillar inner member is provided to the side rail while the upper end of the pillar inner member overlaps a joint of the side rail, and this forms intersections at which rail flanges and pillar flanges cross. At the intersections, stepped sections are formed at the pillar flanges, and in the rail flanges, recesses are formed at portions corresponding to the stepped sections.

6 Claims, 10 Drawing Sheets

SIDE STRUCTURE FOR VEHICLE BODY

TECHNICAL FIELD

The present invention relates to a side structure for a vehicle body, i.e. a side vehicle body structure, in which an upper side of a door opening section is formed by a side rail and a vertical side of the door opening section is formed by providing a pillar on the side rail, and in which a trim member is mounted to and along the side rail and the pillar.

BACKGROUND ART

Generally, in the side vehicle body structures, an upper side of a door opening section is formed by a side rail extending in a front-rear direction of the vehicle in an upper portion of the side vehicle body structure, a downwardly-oriented pillar support section is provided integrally on the side rail, and a pillar extending in a vertical or up-down direction is mounted at its upper end portion to the downwardly-oriented pillar support section. A vertical side of the door opening section is formed by the pillar.

One example of such side vehicle body structures in which the downwardly-oriented pillar support section is provided integrally on the side rail and the pillar is appropriately mounted at its upper end portion to the downwardly-oriented pillar support section is disclosed in Patent Literature 1.

Figure 11:
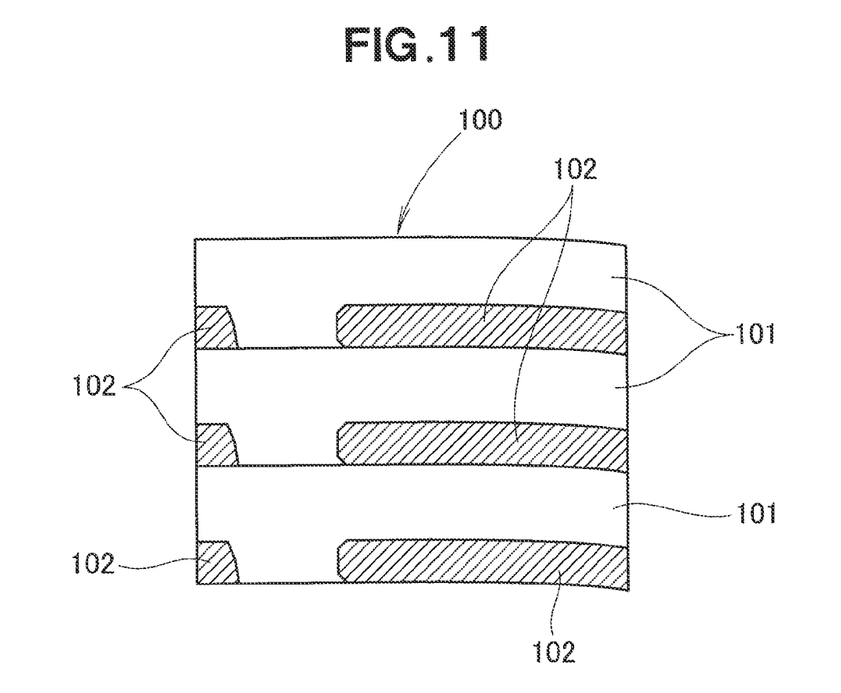
FIG. 11 is a view showing an example manner in which blanks of a side rail of a conventionally-known side vehicle body structure are die-cut.

In the side vehicle body structure disclosed in Patent Literature 1, the downwardly-oriented pillar support section is provided integrally on the side rail, namely, the side rail and the pillar support section are formed integrally with each other. More specifically, a plurality of blanks 101 of the side rail and the pillar support section are integrally die-cut from a panel material (base material) 100 of a generally rectangular shape, as shown in FIG. 11.

However, if the blanks 101 of the side rail and the pillar support section are integrally die-cut from the generally rectangular panel material 100, a considerable amount of remainder 102 would be left over on the panel material 100, and thus, it has heretofore been difficult to use the panel material 100 with minimized waste and thereby enhance a yield rate of the panel material 100.

PRIOR ART LITERATURE

Patent Literature 1: Japanese Patent Application Laid-Open Publication No. 2009-298335

SUMMARY OF INVENTION

Technical Problem

It is therefore an object to provide an improved side vehicle body structure which not only allows the pillar to be appropriately provided on the side rail but also can achieve an enhanced yield rate of the panel material when the blank of the side rail is die-cut from the panel material.

Solution to Problem

According to a first aspect of the instant application, there is provided a side vehicle body structure comprising: a side rail provided in an upper portion of the side vehicle body structure and extending in a front-rear direction of a vehicle body to form an upper side of a door opening section, the side rail having a rail flange projecting downward; a pillar mounted to the side rail to form a vertical side of the door opening section and having a pillar flange projecting in the front-rear direction; and a trim member mounted along the rail flange and the pillar flange to decorate the upper side and the vertical side of the door opening section, which is characterized in that, with the pillar mounted to the side rail in superposed relation thereto, an intersecting section is provided where the rail flange and the pillar flange intersect each other, and in that, in the intersecting section, a stepped portion is formed on one of the rail flange and the pillar flange such that the one of the rail flange and the pillar can avoid other of the rail flange and the pillar flange, and a recess is formed in the other of the rail flange and the pillar flange at a position corresponding to the stepped portion.

Preferably, according to a second aspect, the side rail is divided in a front rail provided closer to a front of the vehicle body and a rear rail joined to a rear end portion of the front rail, and the pillar is superposed on a joint section between the front rail and the rear rail.

Preferably, according to a third aspect, the front rail has a greater thickness than the rear rail.

Preferably, according to a fourth aspect, the side rail is divided in a front rail provided closer to a front of the vehicle body and a rear rail joined to a rear end portion of the front rail, and the side vehicle body structure further comprises a roof arch joined at an end portion to the joint section between the front rail and the rear rail and extending in a vehicle width direction.

Advantageous Effects of Invention

According to the first aspect, the pillar is mounted to the side rail in superposed relation thereto. Further, in the intersecting section where the rail flange and the pillar flange intersect each other, the stepped portion is formed on one of the rail flange and the pillar flange such that the one of the rail flange and the pillar can avoid the other of the rail flange and the pillar flange, and the recess is formed in the other of the rail flange and the pillar flange.

With the stepped portion formed in the one of the rail flange and the pillar flange such that the one of the rail flange and the pillar can avoid the other of the rail flange and the pillar flange, the side rail and the pillar can be provided appropriately with the pillar superposed on the side rail. Thus, the present invention can secure a sufficient connection strength between the side rail and the pillar.

Further, with the recess formed in the other of the rail flange and the pillar flange, the bottom portion of the recess can be spaced from the decorating/sealing trim member. Thus, by the stepped portion being formed in corresponding relation to the recess, the stepped portion can be spaced from the decorating/sealing trim member. As a result, the present invention can eliminate a possibility of the stepped portion hampering the mounting of the trim member.

Besides, in the present invention, the pillar is superposed on the side rail with the rail flange and the pillar flange intersecting each other. Thus, the present invention can eliminate a need for providing the downwardly-oriented pillar support on the side rail as required of the conventionally-known side vehicle body structure. As a result, the present invention allows die-cutting, from the panel material, of blanks of the side rail to be performed with a minimized amount of remainder and can thereby achieve an enhanced yield rate.

According to the second aspect, the side rail is divided in the front rail and the rear rail. Thus, it is possible to make the thickness of the front rail large while making the thickness of the rear rail small. Thus, the present invention can not only increase rigidity of the front rail but also reduce the weight of the rear rail. As a result, the present invention can appropriately bear an impact load input to the front of the vehicle body and reduce the overall weight of the vehicle.

In addition, because the pillar is superposed on the joint section between the front rail and the rear rail, the joint section between the front rail and the rear rail can be reinforced with the pillar. Thus, when an impact load has been input to the front rail, the input impact load is dispersed to the pillar so that the impact load transmitted to the joint section can be significantly reduced. As a result, the present invention can appropriately secure rigidity of the joint section against the impact load.

According to the third aspect, the front rail has a greater thickness than the rear rail. Thus, it is possible to not only increase the rigidity of the front rail but also reduce the weight of the rear rail. As a result, the present invention can not only appropriately bear an impact load input to the front of the vehicle body but also reduce the weight of the vehicle.

According to the fourth aspect, a roof arch is joined at an end portion to the joint section between the front rail and the rear rail. Thus, the joint section between the front rail and the rear rail can be reinforced with the end portion of the roof arch. Thus, when an impact load has been input to the front rail, the input impact load is dispersed to the end portion of the roof arch so that the impact load transmitted to the joint section can be significantly reduced. As a result, the present invention can appropriately secure rigidity of the joint section against the load impact.

DESCRIPTION OF EMBODIMENTS

Now, a description will be given about preferred embodiments of the present invention with reference to the accompanying drawings.

Embodiments

Figure 1:
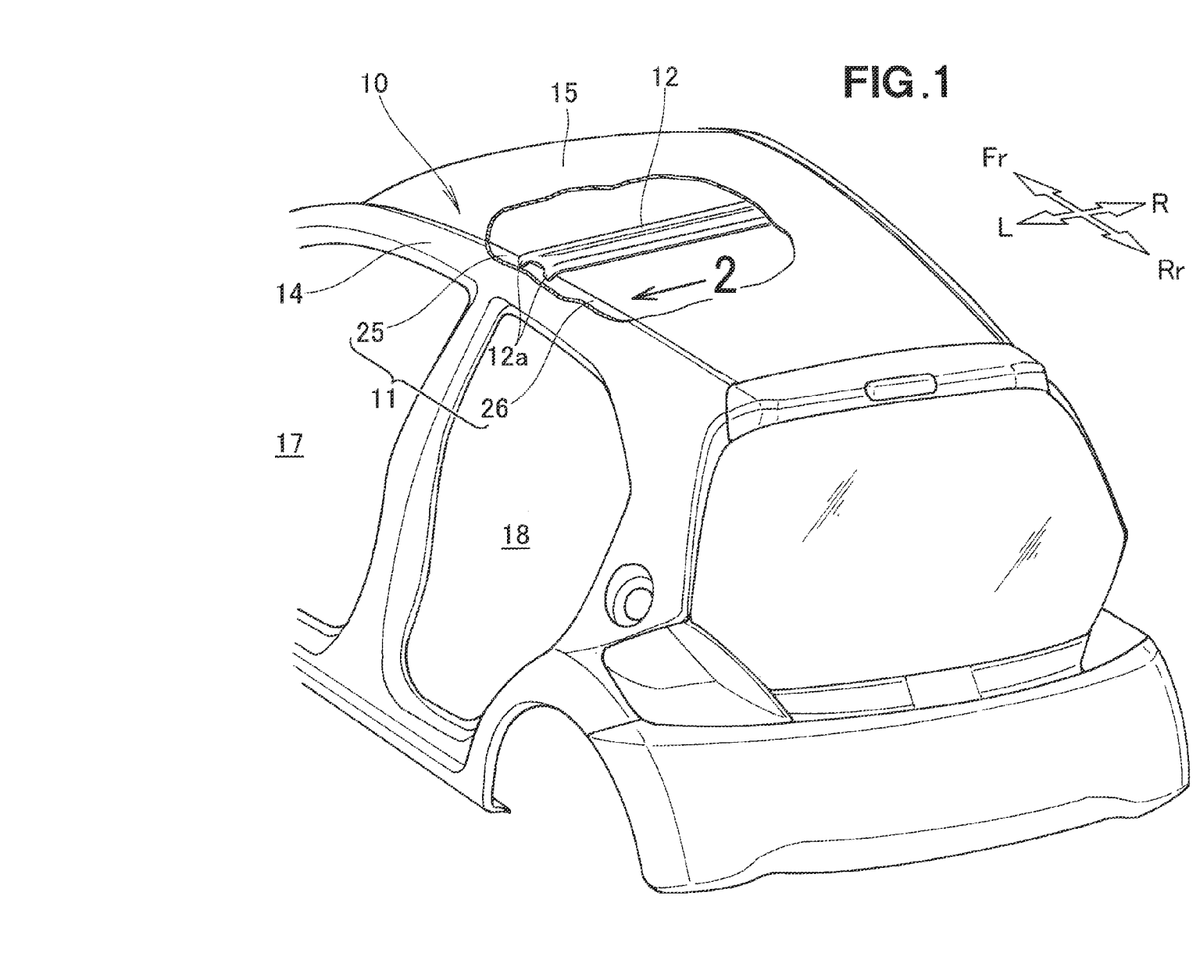
FIG. 1 is a perspective view showing a preferred embodiment of a side vehicle body structure of the present invention.
Figure 2:
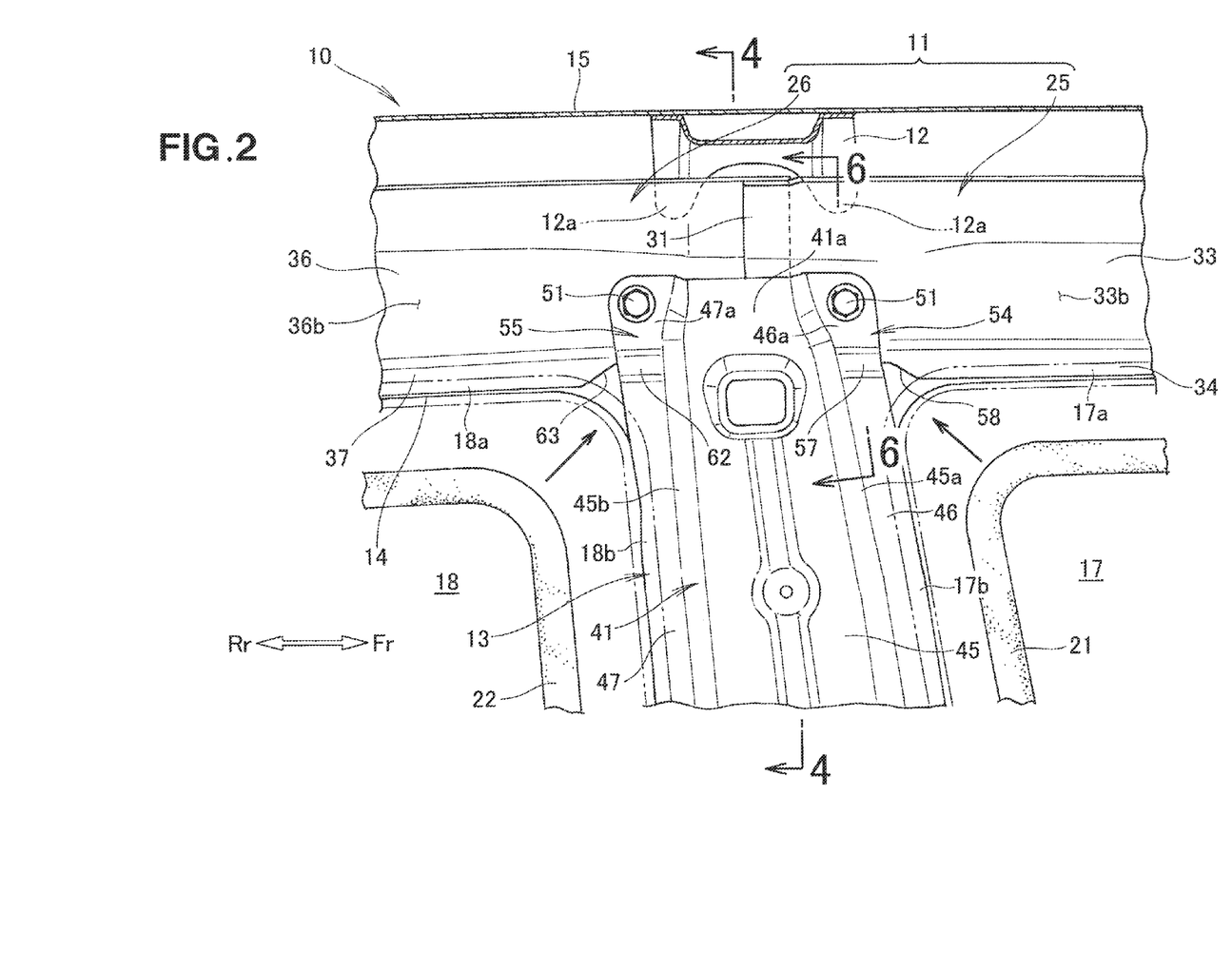
FIG. 2 is a view of the side vehicle body structure of FIG. 1 taken in the direction of arrow 2 of FIG. 1.

As shown in FIGS. 1 and 2, a preferred embodiment of a side vehicle body structure 10 of the present invention includes: a side rail 11 disposed in an upper portion of the side vehicle body structure 10 and extending in a front-rear direction of the vehicle body; a roof arch 12 joined at its left end portion (end portion in the claims 12a to the side rail 11; a center pillar 13 joined to the side rail 11; an outer panel 14 covering, from outside of the vehicle body, the center pillar 13 and the side rail 11; a roof panel 15 disposed over the roof arch 12; and front and rear trim members 21 and 22 provided along front and rear door opening sections 17 and 18, respectively, formed in the side vehicle body structure 10.

Figure 3:
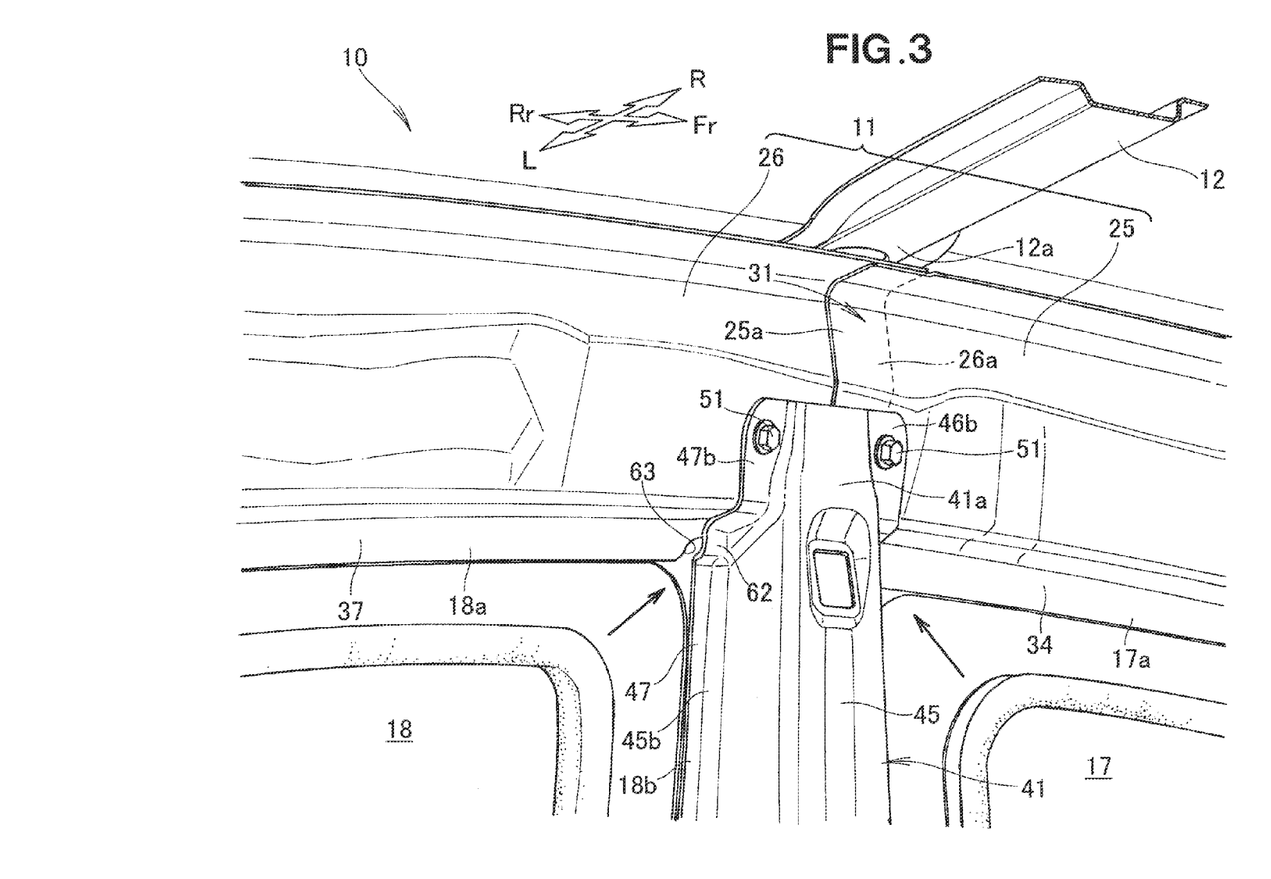
FIG. 3 is a perspective view showing the side vehicle body structure of FIG. 2.
Figure 4:
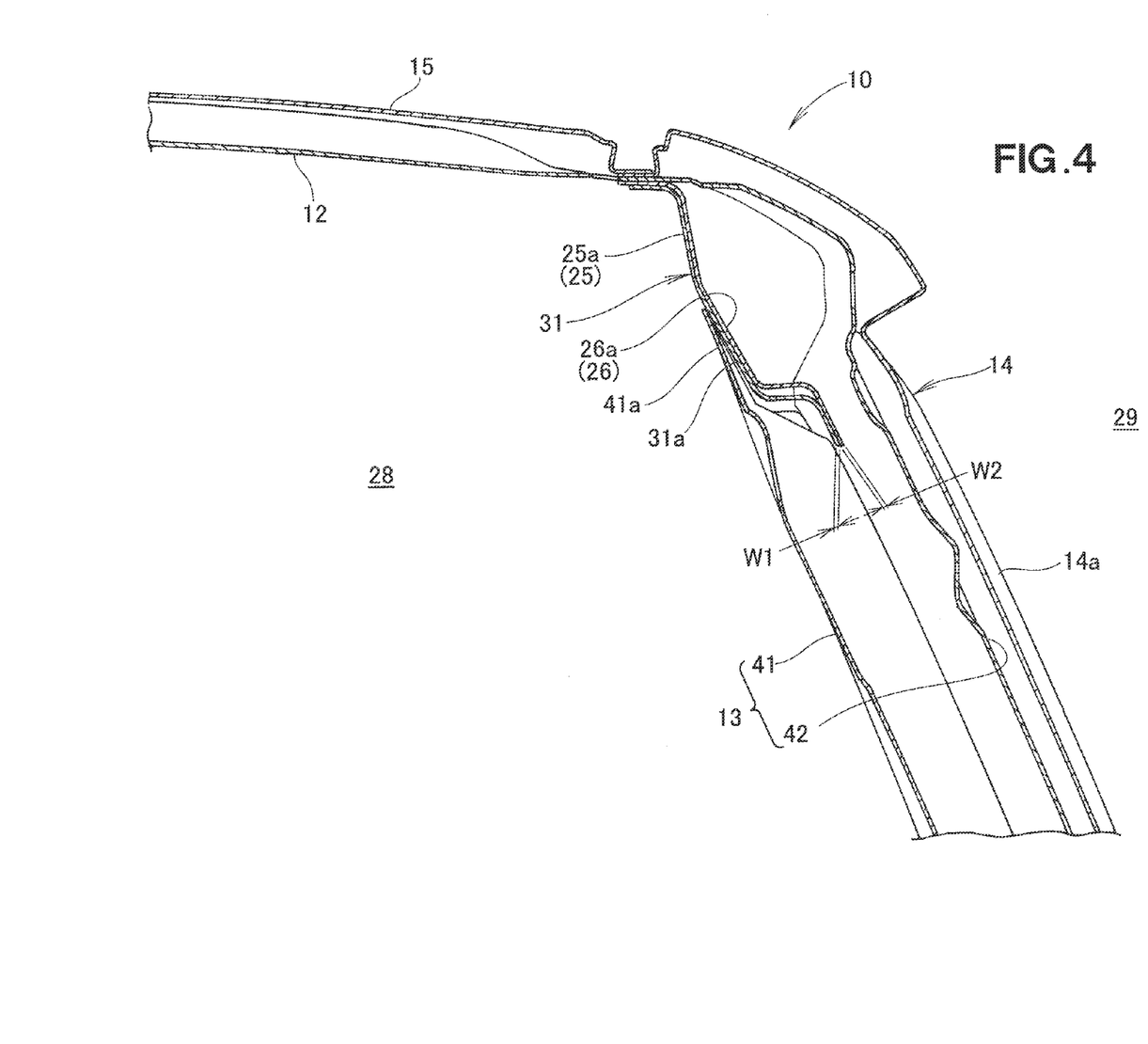
FIG. 4 is a sectional view taken along line 4-4 of FIG. 2.

As shown in FIGS. 3 and 4, the side rail 11 is a rail disposed in an upper portion of the side vehicle body structure 10 and extending in the front-rear direction of the vehicle body to form the upper side 17a of the front door opening section 17 and the upper side 18a of the rear door opening section 18. The side rail 11 is divided in front and rear rails 25 and 26 that are disposed in front and rear portions, respectively, of the vehicle body.

A rear end portion 25a of the front rail 25 is superposed, from the side of a passenger compartment 28, on a front end portion 26a of the rear rail 26. The mutually-superposed rear end portion 25a of the front rail 25 and the front end portion 26a of the rear rail 26 are welded together at a joint section 31, where the rear end portion 25a of the front rail 25 and the front end portion 26a of the rear rail 26 are joined together, by spot welding to thereby form the side rail 11.

Figure 5:
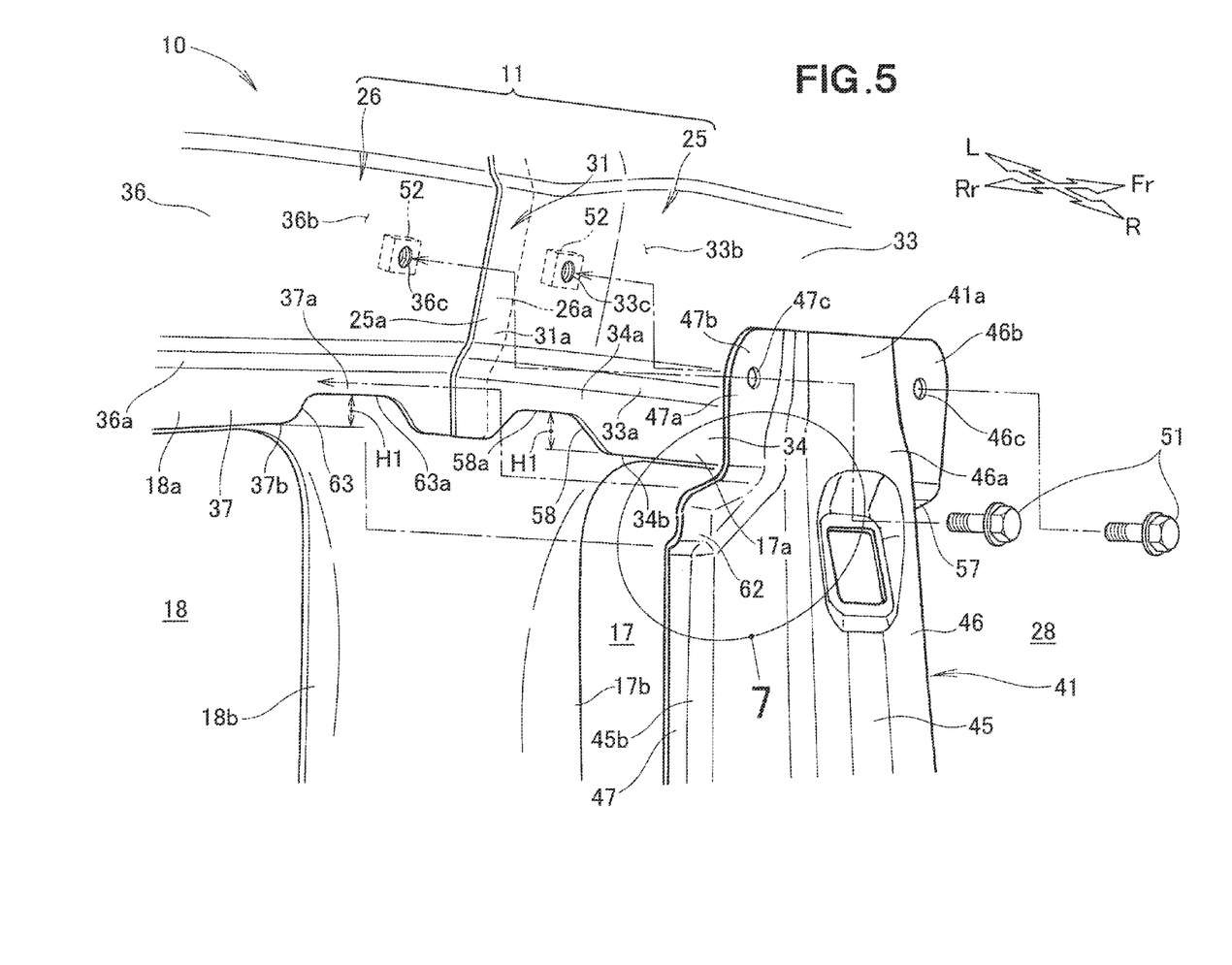
FIG. 5 is an exploded perspective view of the side vehicle body structure shown in FIG. 3.

As shown in FIG. 5, the front rail 25 has a front rail body 33 extending in the front-rear direction, and a front rail flange 34 protruding downward from a lower end portion 33a of the rail body 33. The front rail 25 is in the form of a plate having a thickness dimension W1 (FIG. 4) and formed in a generally straight shape as viewed in side elevation.

The front rail body 33 bulges with respect to the front rail flange 34 toward the passenger compartment 28. The front rail flange 34 is a protrusion extending in the front-rear direction along the lower end portion 33a of the front rail body 33 to form a part of the front door opening section 17 (more specifically an upper side 17a).

The rear rail 26, which is disposed rearwardly of the front rail 25, has a rear rail body 36 extending in the front-rear direction, and a rear rail flange 37 protruding downward from a lower end portion 36a of the rear rail body 36. The rear rail 26 is in the form of a plate having a thickness dimension W2 (FIG. 4) and formed in a generally straight shape as viewed in side elevation.

The rear rail body 36 bulges with respect to the rear rail flange 37 toward the passenger compartment 28. The rear rail flange 37 is a protrusion extending in the front-rear direction along the lower end portion 36a of the rear rail body 36 to form a part of the rear door opening section 18 (more specifically the upper side 18a).

As shown in FIGS. 3 and 4, the thickness W1 of the front rail 25 and the thickness W2 of the rear rail 26 have a relationship of W1>W2. With the side rail 11 divided in the front rail 25 and the rear rail 26 as set forth above, it is possible to make the thickness W1 of the front rail 25 large while making the thickness W2 of the rear rail 26 small.

By making the thickness W1 of the front rail 25 large as noted above, it is possible to increase rigidity of the front rail 25 so that the front rail 25 can appropriately bear an impact load input to the front of the vehicle body. Further, by making the thickness W2 of the rear rail 26 small as noted above, it is possible to reduce the weight of the rear rail 26 so that the overall weight of the vehicle body can be reduced.

The roof arch 12 extends in a vehicle width direction between the left side rail 11 and a not-shown right side rail 11. The roof arch 12 is joined at its left end portion 12a to the joint section 31 of the left side rail 11 by spot welding and joined at its right end portion 12a to the joint section 31 (upper end portion) of the right side rail 11 by spot welding (the right side rail 11, joint section 31 of the right side rail 11 and right end portion 12*a* are not shown).

The center pillar 13, which is a member extending in the vertical direction, includes an inner pillar (pillar in the claims) 41 provided adjacent to the passenger compartment 28 and a pillar stiffener 42 provided adjacent to the outside 29 of the vehicle. With a pillar section 14*a* of the outer panel 14 superposed on the inner pillar 41 from the outside 29 of the vehicle, a closed section is defined by the inner pillar 41 and the pillar section 14*a*. The pillar stiffener 42 is accommodated in the closed section thus defined by the inner pillar 41 and the pillar section 14*a*.

As shown in FIGS. 2 and 5, the inner pillar 41, which extends in the vertical direction, is joined to the joint section 31 of the side rail 11 with its upper end portion 41*a* superposed on a lower half portion 31*a* of the joint section 31 from the side of the passenger compartment 28. More specifically, the upper end portion 41*a* of the inner pillar 41 is superposed on and across the lower half portion 31*a*. In this superposed state, the upper end portion 41*a* of the inner pillar 41 generally orthogonally meets or intersects the side rail 11.

The inner pillar 41 includes a pillar body 45 extending in the vertical direction, a front pillar flange 46 projecting from a front end portion 45*a* of the pillar body 45 toward the front of the vehicle body 45, and a rear pillar flange 47 projecting from a rear end portion 45*b* of the pillar body 45 toward the rear of the vehicle body 45.

The inner pillar 41 is formed in a substantially hat-like sectional shape (namely, a shape where the pillar body 45 bulges with respect to the front and rear pillar flanges 46 and 47 toward the passenger compartment 28 in a substantially U sectional shape).

The front pillar flange 46 is a protrusion forming a part of the front door opening section 17 (more specifically the vertical side 17*b*), while the front pillar flange 47 is a protrusion forming a part of the rear door opening section 18 (more specifically the vertical side 18*b*).

In the upper end portion 41*a* of the inner pillar 41, the front end portion 45*a* and rear end portion 45*b* of the pillar body 45 are formed to be capable of being superposed on the front and rear rail bodies 33 and 36. Thus, as noted above, the upper end portion 41*a* of the inner pillar 41 is superposed on the lower portion 31*a* of the joint section 31, striding across the lower portion 31*a*, in such a manner as to substantially orthogonally meet or intersect the side rail 11.

In this manner, a front intersecting section (intersecting section in the claims) 54 is provided where the front rail flange 34 and the front pillar flange 46 meet or intersect each other, and a rear intersecting section (intersecting section in the claims) 55 is provided where the rear rail flange 37 and the rear pillar flange 47 meet or intersect each other.

Figure 6:
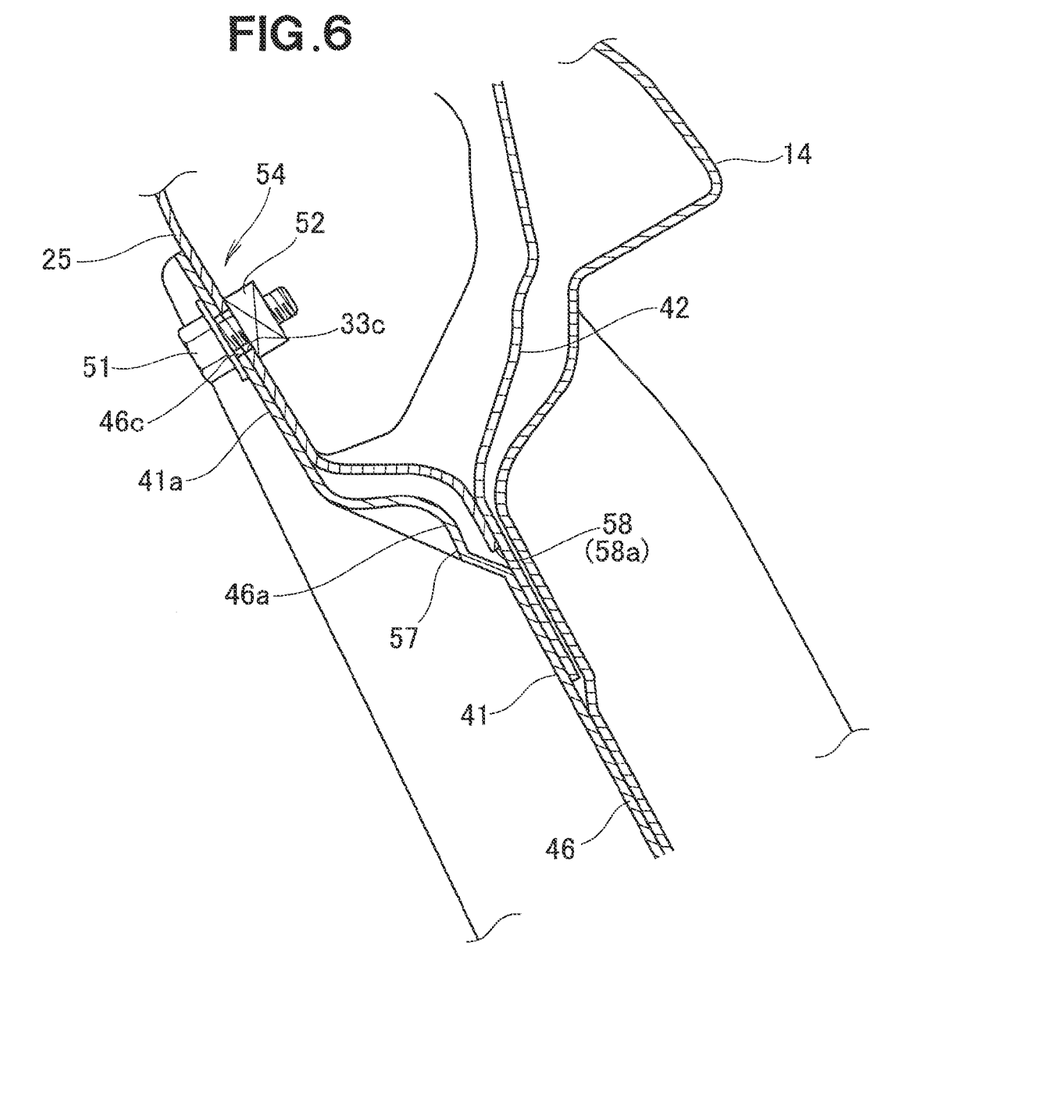
FIG. 6 is a sectional view taken along line 6-6 of FIG. 2.

Further, in the front interesting section 54, as shown in FIGS. 2, 5 and 6, a front stepped portion (stepped portion in the claims) 57 is formed on an upper end portion 46*a* of the front pillar flange 46, and a front recess (recess in the claims) 58 is formed in a rear end portion (i.e., portion corresponding to the stepped portion 54) 34*a* of the front rail flange 34.

The front stepped portion 57 bulges toward the passenger compartment 28 in such a manner that the pillar flange 46 can avoid the front rail flange 34. The front recess 58 is located in the rear end portion 34*a* of the front rail flange 34 and recessed concavely higher than the side edge 34*b* of the front rail flange 34. Thus, a bottom portion 58*a* of the front recess 58 is located higher by a distance H1 than the side edge 34*b* of the front rail flange 34.

Figure 7:
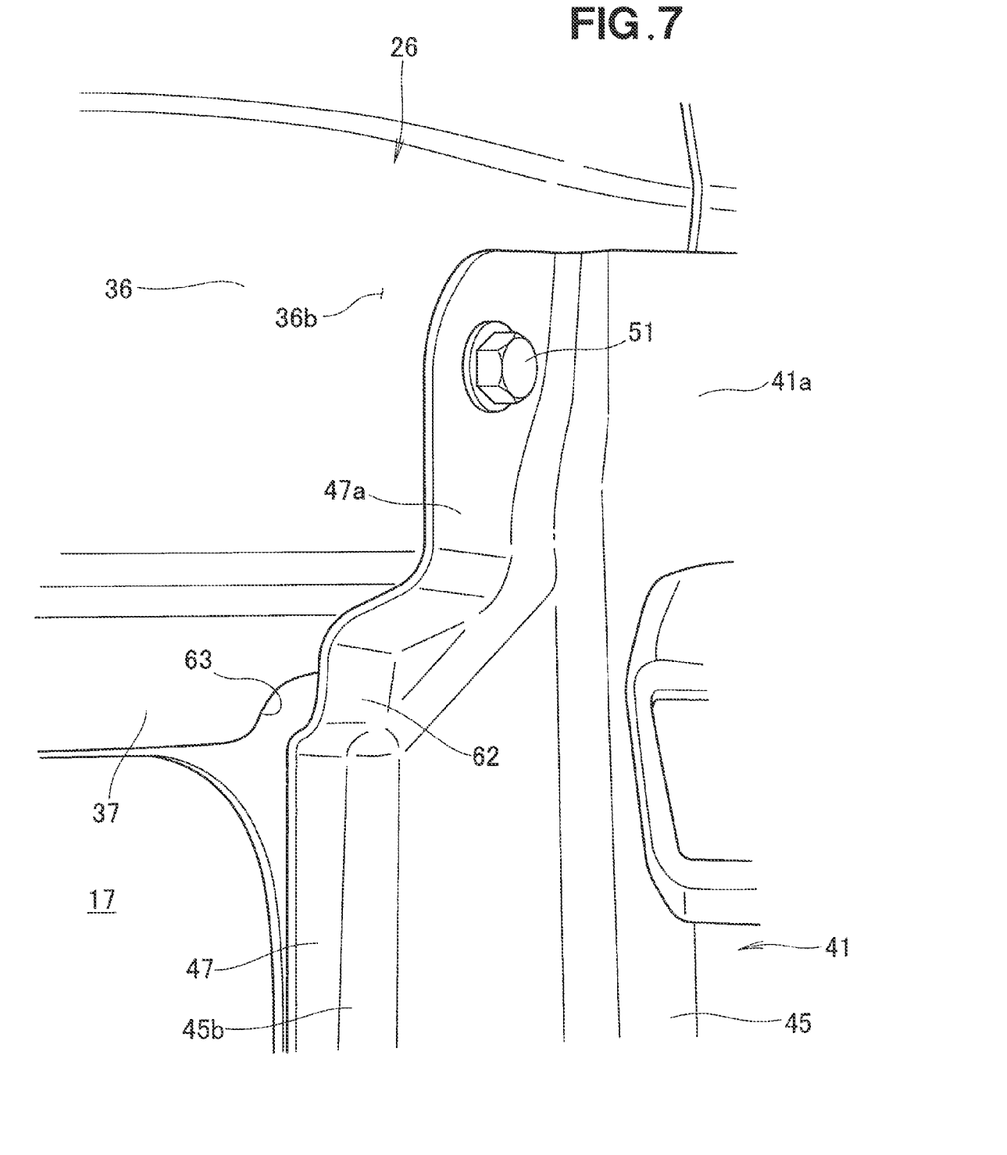
FIG. 7 is an enlarged view of a section indicated at reference numeral 7 in FIG. 5.

Similarly, in the rear interesting section 55, as shown in FIGS. 5 and 7, a rear stepped portion (stepped portion in the claims) 62 is formed on an upper end portion 47*a* of the rear pillar flange 47, and a rear recess (recess in the claims) 63 is formed in a front end portion (i.e., portion corresponding to the stepped portion 62) 37*a* of the rear rail flange 37. The rear stepped portion 62 bulges toward the passenger compartment 28 in such a manner that the rear pillar flange 47 can avoid the rear rail flange 37.

The front recess 63 is located in a position corresponding to the rear stepped portion 62 and recessed concavely higher than the side edge 37*b* of the rear rail flange 37. Thus, a bottom portion 63*a* of the rear recess 63 is located higher by a distance H1 than the side edge 37*b* of the rear rail flange 37.

Namely, as shown in FIGS. 2 and 5, the upper end portion 46*a* of the front pillar flange 46 has the stepped portion 57 provided therein in such a manner to avoid the front rail flange 34, and the upper end portion 47*a* of the rear pillar flange 47 has the stepped portion 62 provided therein in such a manner to avoid the rear rail flange 37. Thus, the lower half portion 31*a* of the joint section 31 and the upper end portion 41*a* of the inner pillar 41 can be provided (mounted) appropriately with the upper end portion 41*a* superposed on the joint section 31 (more specifically the lower half portion 31*a* of FIG. 5).

More specifically, a mounting portion 46*b* of the front pillar flange 46 (upper end portion 46*a*) can be reliably abutted against the surface 33*b* of the front rail body 33. Further, an insertion hole 47*c* formed in the mounting portion 46*b* can be reliably positioned in alignment with a mounting hole 33*c* of the front rail body 33.

Similarly, a mounting portion 47*b* of the rear pillar flange 47 (upper end portion 47*a*) can be reliably abutted against the surface 36*b* of the rear rail body 36. Further, an insertion hole 47*c* formed in the mounting portion 47*b* can be reliably positioned in alignment with a mounting hole 36*c* of the rear rail body 36.

In the aforementioned manner, the mounting portion 46*b* of the front pillar flange 46 can be reliably mounted to the front rail body 33 by means of bolts 51 and nuts 52. Further, the mounting portion 47*b* of the rear pillar flange 47 can be reliably mounted to the rear rail body 36 by means of bolts 51 and nuts 52. Thus, the instant embodiment can secure a sufficient connection strength between the side rail 11 and the upper end portion 41*a* of the inner pillar 41.

Further, the upper end portion 41*a* of the inner pillar 41 is superposed on the joint section 31 (lower half portion 31*a*) between the front rail 25 and the rear rail 26. Thus, the joint section 31 between the front rail 25 and the rear rail 26 can be reinforced with the upper end portion 41*a* of the inner pillar 41.

Thus, when an impact load has been input to the front rail 25, the input impact load is dispersed to the upper end portion 41*a* of the inner pillar 41 so that the impact load transmitted to the joint section 31 can be significantly reduced. Thus, the instant embodiment can appropriately secure rigidity of the joint section 31 against the load impact.

Further, in the instant embodiment, the left end portion 12*a* of the roof arch 12*a* is joined to the joint section 31 between the front rail 25 and the rear rail 26. Thus, the joint section 31 between the front rail 25 and the rear rail 26 can be reinforced with the left end portion 12*a* of the roof arch 12. Thus, when an impact load has been input to the joint portion of the front rail 25, the input impact load can be dispersed to the left end portion 12*a* of the roof arch 12, so that the impact load transmitted to the joint section 31 can be significantly reduced. Thus, the instant embodiment can appropriately secure rigidity of the joint section 31 against the load impact.

As shown in FIGS. 2 and 3, the front trim member 21 is mounted to and along the front rail flange 34 and front pillar flange 46. The front trim member 21, which is formed for example in a substantially U sectional shape, is mounted by being sandwichedly retained by the upper side 17a and vertical side 17b of the front door opening section 17, to thereby decorate and seal the upper side 17a and vertical side 17b.

The rear trim member 22 is mounted to and along the rear rail flange 37 and front pillar flange 47. The rear trim member 22, which is formed for example in a substantially U sectional shape like the front trim member 21, is mounted by being sandwichingly retained by the upper side 18a and vertical side 18b of the front rear opening 18, to thereby decorate and seal the upper side 18a and vertical side 18b.

Figure 8:
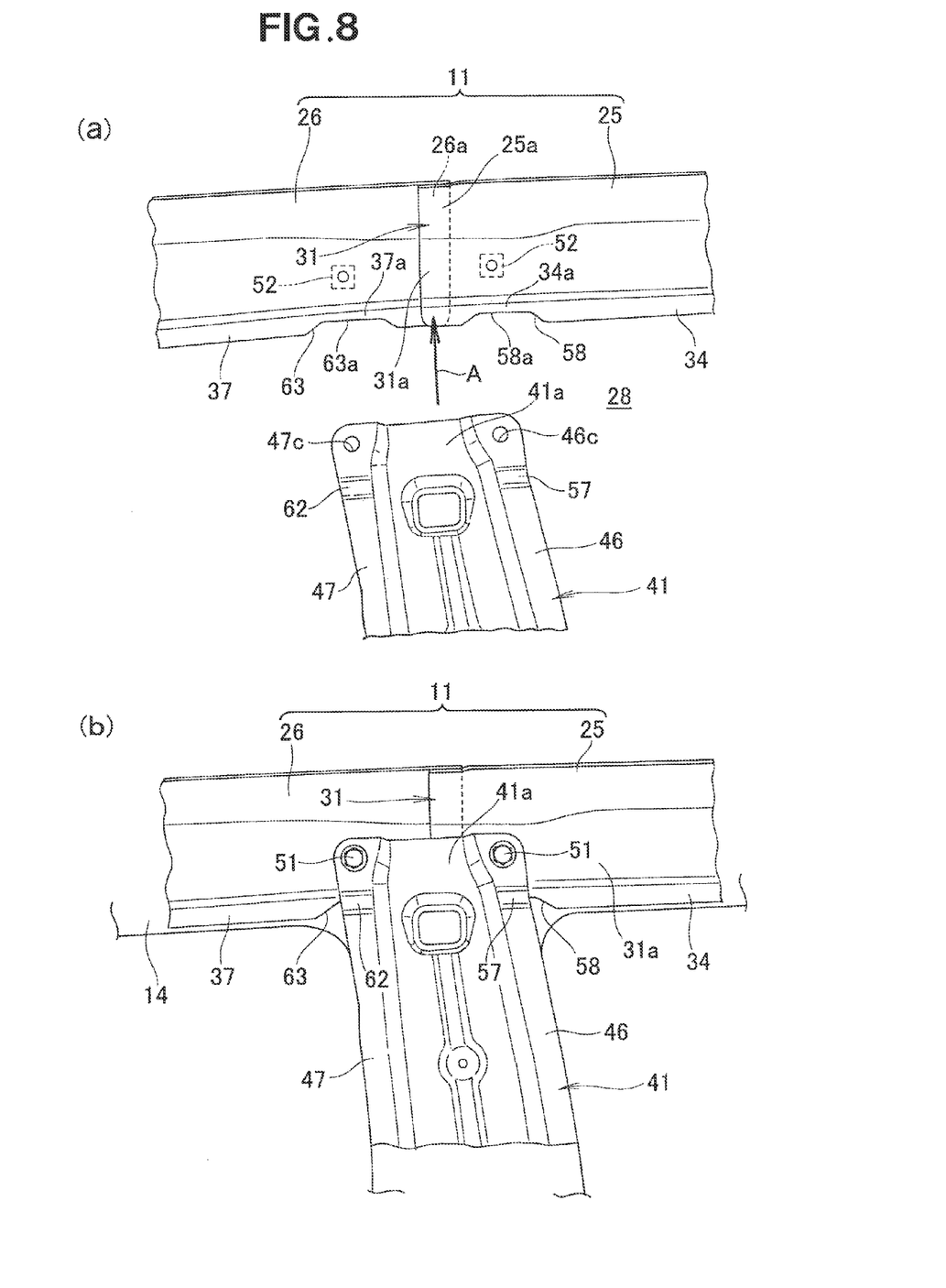
FIG. 8 is a view showing an example manner in which a center pillar is mounted to a side rail.
Figure 9:
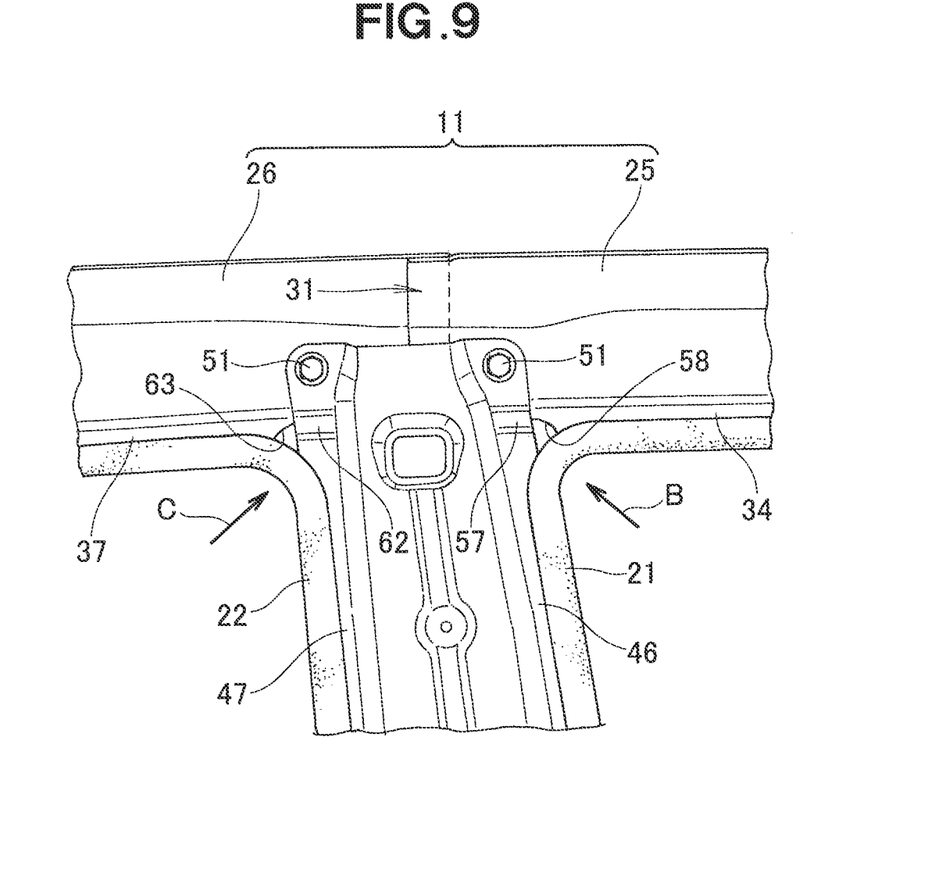
FIG. 9 is a view showing an example manner in which trim members are mounted to the side rail and the center pillar.

The following describe, with reference to FIGS. 8 and 9, an example manner in which the center pillar 13 is mounted to the side rail 11.

As shown in (a) FIG. 8, the rear end portion 25a of the front rail 25 is superposed, from the side of the passenger compartment 28, on the front end portion 26a of the rear rail 26, and then, the mutually-superposed rear end portion 25a of the front rail 25 and front end portion 26a of the rear rail 26 joint section 31 (i.e., respective joint portions of the front and rear rails 25 and 26) are joined together by spot welding. The side rail 11 is formed by thus joining together the rear rail 26 and the front rail 25.

After the formation of the side rail 11, the upper end portion 41a of the inner pillar 41 is superposed, from the side of the passenger compartment 28, on the lower half portion 31a of the joint section 31, as indicated by arrow A.

After the upper end portion 41a of the inner pillar 41 has been superposed on the joint section 31 (lower half portion 31a), as shown in FIG. 8(b), it is fastened to the side rail's joint section 31 by means of the bolts 51 and nuts 52. After the upper end portion 41a of the inner pillar 41 has been fastened to the joint section 31 by means of the bolts 51 and nuts 52, the pillar stiffener 42 (FIG. 4) and the outer panel 14 are superposed on and joined to the inner pillar 41 from outside the vehicle body 14.

As shown in FIG. 9, the front trim member 21 is mounted to and along the front pillar flange 46 and front rail flange 34 as indicated by arrow B, and the rear trim member 22 is mounted to and along the rear pillar flange 47 and rear rail flange 37 as indicated by arrow C.

The front recess 58 is formed in the rear end portion 34a of the front rail flange 34, and the rear recess 63 is formed in the front end portion 37a of the rear rail flange 37. Thus, the bottom portion 58a of the front recess 58 can be spaced from the front trim member 21 (FIG. 9), and the bottom portion 63a of the rear recess 63 can be spaced from the rear trim member 22 (FIG. 9).

With the bottom portion 58a (FIG. 8a) of the front recess 58 spaced from the front trim member 21, the front stepped portion 57 can be spaced from the front trim member 21, as shown in 9. Similarly, with the bottom portion 63a (FIG. 8a) of the rear recess 61 spaced from the rear trim member 22, the rear stepped portion 62 can be spaced from the front trim member 21. Thus, the instant embodiment can eliminate a possibility of the front stepped portion 57 from hampering mounting of the front trim member 21 and the rear stepped portion 62 hampering mounting of the rear trim member 22.

Figure 10:
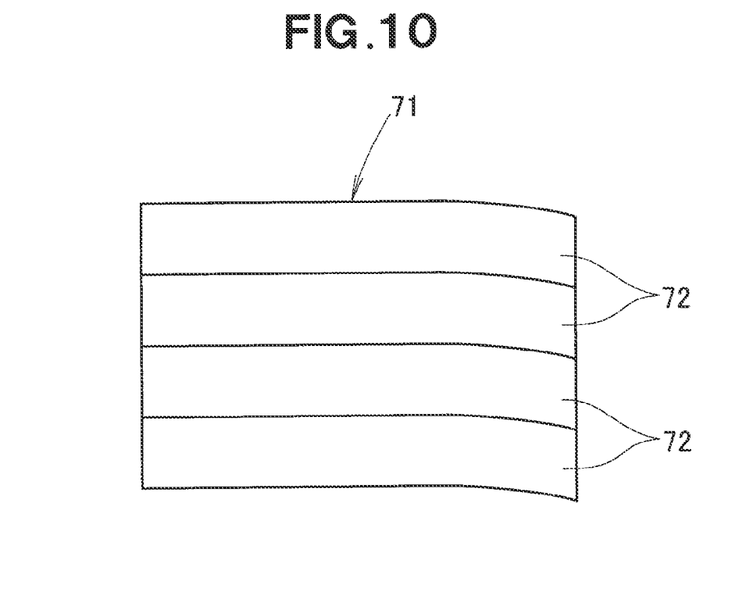
FIG. 10 is a view showing an example manner in which blanks of the side rail (front rail) are die-cut.

The following describe, with reference to FIGS. 8 and 10, an example manner in which blanks 72 of the side rail 11 (front rail 25) are die-cut.

As shown in (a) and (b) FIG. 8, the upper end portion 41a of the inner pillar 41 is superposed on the joint section 31 of the side rail 11 in such a manner that the front rail flange 34 and the front pillar flange 46 intersect each other and that the rear rail flange 37 and the rear pillar flange 47 intersect each other. Thus, the instant embodiment can eliminate a need for providing the downwardly-oriented pillar support on the side rail as required of the conventionally-known side vehicle body structure.

Because the downwardly-oriented pillar support can be eliminated from the side rail, the side rail 11 (front rail 25) can be formed in a substantially straight shape as viewed in side elevation (see (a) of FIG. 8). Because the front rail 25 can be formed in a substantially straight shape as viewed in side elevation, the blanks 72 of the side rail 11 can be formed in a substantially straight shape as shown in FIG. 10.

Because the blanks 72 of the side rail 11 can be formed in a substantially straight shape, no considerable amount of remainder 102 would be left over on a panel material 71, and thus, in die-cutting, from the panel material 71, of the blanks of the side rail 11, the instant embodiment allows the panel material 71 to be used with a minimized amount of remainder and hence with minimized waste, and thus permits an enhanced yield rate of the panel material 71.

As shown in (a) of FIG. 8, the rear rail 26 of the side rail 11 can be formed in a substantially straight shape similarly to the front rail 25. Thus, in die-cutting, from the panel material, of the rear rail 26, the instant embodiment allows the panel material 71 to be used with minimized waste and thus permits an enhanced yield rate of the panel material 71.

It should be appreciated that the side vehicle body structure of the present invention is not limited to the above-described preferred embodiment and may be modified as necessary. For example, whereas the preferred embodiment of the present invention has been described above in relation to the case where the front and rear pillar flanges 46 and 47 have respective (i.e., front and rear) stepped portions 57 and 62 and the front and rear rail flanges 34 and 37 have respective (front and rear) recesses 58 and 63, the present invention is no so limited, and, for example, the front and rear recesses 58 and 63 may be formed in the front and rear pillar flanges 46 and 47 while the front and rear stepped portions 57 and 62 may be formed in the front and rear rail flanges 34 and 37. In this way, the upper end portion 41a can be superposed, from outside the vehicle body 29, on the joint section 31 of the side rail 11.

Further, whereas the preferred embodiment has been described above in relation to the case where the upper end portion 41a of the inner pillar 41 is fastened to the side rail 11 by means of a pair of the bolts 51, the present invention is not so limited, and the upper end portion 41a of the inner pillar 41 may be fixed to the side rail 11 by spot welding or otherwise.

Furthermore, whereas the preferred embodiment has been described above in relation to the center pillar 13, the present invention is applicable to other pillars, such as a front pillar and a quarter pillar.

Furthermore, the shapes and constructions of the side vehicle body structure 10, side rail 11, roof arch 12, center pillar 13, front and rear door opening sections 17 and 18, front and rear trim members 21 and 22, front rail 25, rear rail 26, front and rear rail flanges 34 and 37, inner pillar 41, front and rear pillar flanges 46 and 47, front and rear intersecting sections 54 and 55, front and rear stepped portions 57 and 62, front and rear recesses 58 and 63, etc. are not limited to those illustratively shown and described in relation to the preferred embodiment and may be modified as necessary.

INDUSTRIAL APPLICABILITY

The present invention is well suited for application to automotive vehicles in which an upper side of a door opening section is formed by a side rail and a vertical side of the door opening section is formed by providing a pillar on the side rail.

LEGEND

10 ... side vehicle body structure, 11 ... side rail, 12 ... roof arch, 12a ... left end portion (end portion in the claims) of roof arch, 13 ... center pillar, 17, 18 ... front and rear door opening sections (door opening section), 17a ... upper side of front door opening section, 17b ... vertical side of front door opening section, 18a ... upper side of rear door opening section, 18b ... vertical side of rear door opening section, 21, 22 ... front and rear trim members (trim member), 25 ... front rail, 25a ... rear end portion of front rail, 26 ... rear rail, 26a ... front end portion of rear rail, 31 ... joint section, 31a ... lower half portion of joint section, 34 ... front rail flange (rail flange), 34a ... rear end portion (portion corresponding to front stepped portion) of front rail flange, 37 ... rear rail flange (rail flange), 41 ... inner pillar (pillar), 41a ... upper end portion of inner pillar, 46 ... front pillar flange (pillar flange), 47 ... rear pillar flange (pillar flange), 54 ... front intersecting section (intersecting section), 55 ... rear intersecting section (intersecting section), 57 ... front stepped portion (stepped portion), 58 ... front recess (recess), 62 ... rear stepped portion (stepped portion), 63 ... rear recess (recess), W1 thickness of front rail, W2 ... thickness of rear rail

The invention claimed is:

1. A side vehicle body structure comprising: a side rail provided in an upper portion of the side vehicle body structure and extending in a front-rear direction of a vehicle body to form an upper side of a door opening section, the side rail having a rail flange projecting downward; a pillar mounted to the side rail to form a vertical side of the door opening section and having a pillar flange projecting in the front-rear direction; and a trim member mounted along the rail flange and the pillar flange to decorate the upper side and the vertical side of the door opening section, wherein, with the pillar mounted to the side rail in superposed relation thereto, an intersecting section is provided where the rail flange and the pillar flange intersect each other, and wherein, in the intersecting section, a stepped portion is formed on one of the rail flange and the pillar flange such that the one of the rail flange and the pillar can avoid other of the rail flange and the pillar flange, and a recess is formed in the other of the rail flange and the pillar flange at a position corresponding to the stepped portion.

2. The side vehicle body structure according to claim 1, wherein the side rail is divided in a front rail provided closer to a front of the vehicle body and a rear rail joined to a rear end portion of the front rail, and the pillar is superposed on a joint section between the front rail and the rear rail.

3. The side vehicle body structure according to claim 2, wherein the front rail has a greater thickness than the rear rail.

4. The side vehicle body structure according to claim 1, wherein the side rail is divided in a front rail provided closer to a front of the vehicle body and a rear rail joined to a rear end portion of the front rail, and which further comprises a roof arch joined at an end portion to the joint section between the front rail and the rear rail and extending in a vehicle width direction.

5. The side vehicle body structure according to claim 2, further comprising a roof arch joined at an end portion to the joint section between the front rail and the rear rail and extending in a vehicle width direction.

6. The side vehicle body structure according to claim 3, further comprising a roof arch joined at an end portion to the joint section between the front rail and the rear rail and extending in a vehicle width direction.

* * * * *